(12) United States Patent
Roumeliotis et al.

(10) Patent No.: US 8,447,810 B2
(45) Date of Patent: *May 21, 2013

(54) USER CONTRIBUTION BASED MAPPING SYSTEM AND METHOD

(75) Inventors: Tasos Roumeliotis, Orinda, CA (US); Scott Hotes, Berkeley, CA (US); Daniel Hodges, San Francisco, CA (US); Joel Grossman, San Francisco, CA (US); Jason Matthew Finkelstein, San Francisco, CA (US)

(73) Assignee: WaveMarket, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,768

(22) Filed: Dec. 4, 2011

(65) Prior Publication Data

US 2012/0077523 A1 Mar. 29, 2012

Related U.S. Application Data

(63) Continuation of application No. 12/406,917, filed on Mar. 18, 2009, now Pat. No. 8,073,907.

(51) Int. Cl.
*G06F 15/16* (2006.01)

(52) U.S. Cl.
USPC ........... 709/204; 709/206; 709/217; 709/219; 455/456.1; 455/456.3

(58) Field of Classification Search
USPC ............... 709/204–206, 217–219; 455/456.3, 455/414, 2, 456.1, 422.1
See application file for complete search history.

(56) References Cited

U.S. PATENT DOCUMENTS

| | | | |
|---|---|---|---|
| 5,833,479 A | 11/1998 | Talbot | |
| 6,243,039 B1 | 6/2001 | Elliott | |
| 6,437,696 B1 | 8/2002 | Lemelson et al. | |
| 6,701,234 B1 | 3/2004 | Vogelsang et al. | |
| 6,813,502 B2 | 11/2004 | Son et al. | |
| 6,816,720 B2 | 11/2004 | Hussain et al. | |
| 6,834,195 B2 | 12/2004 | Brandenberg et al. | |
| 6,873,850 B2 | 3/2005 | Dowling et al. | |
| 6,885,874 B2 | 4/2005 | Grube et al. | |
| 6,895,238 B2 | 5/2005 | Newell et al. | |
| 6,961,562 B2 | 11/2005 | Ross | |
| 6,985,696 B2 | 1/2006 | Bromham et al. | |
| 7,248,961 B2 * | 7/2007 | Park et al. | ...... 701/117 |
| 7,593,740 B2 * | 9/2009 | Crowley et al. | ...... 455/456.3 |
| 7,606,772 B2 | 10/2009 | Flinn et al. | |

(Continued)

OTHER PUBLICATIONS

Streetadvisor.com, publication date unknown (access date Jun. 18, 2008).

(Continued)

*Primary Examiner* — Ruolei Zong
(74) *Attorney, Agent, or Firm* — Dovas Law, P.C.

(57) ABSTRACT

A computer implemented user contribution method is provided. The method includes receiving identifying information from a plurality of users and receiving from the plurality of users indications of one or more geographic areas. A quality value of the one or more geographic areas is determined based on the indications of the one or more geographic areas from the plurality of users, and the quality value is transmitted to one or more of the plurality of users. The present invention further provides a user contribution based mapping system.

18 Claims, 4 Drawing Sheets

U.S. PATENT DOCUMENTS

| | | | |
|---|---|---|---|
| 7,881,864 B2 * | 2/2011 | Smith | 701/439 |
| 8,073,907 B2 | 12/2011 | Roumeliotis et al. | |
| 8,145,240 B2 | 3/2012 | Roumeliotis et al. | |
| 8,229,421 B2 | 7/2012 | Hotes et al. | |
| 8,244,236 B2 | 8/2012 | Roumeliotis et al. | |
| 2002/0116266 A1 | 8/2002 | Marshall | |
| 2003/0216960 A1 | 11/2003 | Postrel | |
| 2004/0122734 A1 * | 6/2004 | Schleicher et al. | 705/14 |
| 2004/0214584 A1 | 10/2004 | Marinier | |
| 2005/0195193 A1 | 9/2005 | Lehman | |
| 2005/0282559 A1 | 12/2005 | Erskine et al. | |
| 2006/0009234 A1 | 1/2006 | Freer | |
| 2006/0089878 A1 | 4/2006 | Roberts et al. | |
| 2006/0135120 A1 | 6/2006 | Likourezos | |
| 2006/0200435 A1 | 9/2006 | Flinn et al. | |
| 2006/0270421 A1 * | 11/2006 | Phillips et al. | 455/457 |
| 2007/0100595 A1 | 5/2007 | Earles | |
| 2007/0142068 A1 | 6/2007 | Matsuo | |
| 2007/0218900 A1 * | 9/2007 | Abhyanker | 455/435.1 |
| 2007/0273558 A1 | 11/2007 | Smith et al. | |
| 2007/0282678 A1 | 12/2007 | Dendi et al. | |
| 2008/0018453 A1 | 1/2008 | Adler | |
| 2008/0027634 A1 | 1/2008 | Obradovich et al. | |
| 2008/0071749 A1 | 3/2008 | Schloter | |
| 2008/0077489 A1 | 3/2008 | Gilley et al. | |
| 2008/0119207 A1 | 5/2008 | Harris | |
| 2008/0146250 A1 * | 6/2008 | Aaron | 455/456.3 |
| 2008/0153511 A1 | 6/2008 | Mock | |
| 2010/0241496 A1 | 9/2010 | Gupta et al. | |
| 2012/0077523 A1 | 3/2012 | Roumeliotis et al. | |
| 2012/0135756 A1 | 5/2012 | Rosso et al. | |
| 2012/0202528 A1 | 8/2012 | Roumeliotis et al. | |

OTHER PUBLICATIONS

Office Action dated Oct. 11, 2011 for U.S. Appl. No. 12/406,774.
Office Action dated Jun. 22, 2012 for U.S. Appl. No. 13/429,358.
Office Action dated Mar. 30, 2011 for U.S. Appl. No. 12/406,917.
Office Action dated Mar. 15, 2012 for U.S. Appl. No. 13/310,768.
Office Action dated Jul. 19, 2012 for U.S. Appl. No. 12/611,109.

* cited by examiner

USER CONTRIBUTION BASED MAPPING SYSTEM AND METHOD

CROSS REFERENCE TO RELATED APPLICATION(S)

This application is a continuation of U.S. patent application Ser. No. 12/406,917, filed Mar. 18, 2009, which is incorporated by reference as if fully set forth.

BACKGROUND

As increasingly unfettered mobility has become a normal part of modern life, people frequently desire to determine a quality of a particular travel destination. They may want to know typical traffic conditions of a particular road, whether a particular neighborhood is safe and accommodating to children, or whether a particular area is more residential or commercial in nature. Someone may desire this information for their own direct benefit, or alternatively, for use in supervising travel of others who they are responsible for, such as their children or employees. Teachers or parents may require that children for whom they are responsible avoid certain locations or adhere to certain pre-defined routes on their way to and from school or other destinations. Employers, in an effort to enhance worker productivity, may wish to enforce schedules defining where employees should be at particular times during the work day.

Locatable mobile devices such as mobile telephones, cellular-enabled personal computers and GPS systems provide reliable means to determine the location of a user. It would be desirable to provide effective methods for determining a quality of a particular geographic area and for establishing and maintaining mobility control over a user of a locatable mobile device.

SUMMARY

The present invention provides a computer implemented user contribution method. The method includes receiving identifying information from a plurality of users and receiving from the plurality of users indications of one or more geographic areas. A quality value of the one or more geographic areas is determined based on the indications of one or more geographic areas from the plurality of users, and the quality value is transmitted to one or more of the plurality of users.

The present invention further provides a user contribution based mapping system including a computing device with a memory having instructions operable to enable the computing device to perform a procedure. The procedure includes receiving identifying information from at least a first user and a second user and receiving from at least the first user and the second user indications of at least one geographic area. The procedure further includes determining a quality value of the at least one geographic area based on the indications of the at least one geographic area and transmitting the quality value to a third user.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Certain terminology is used in the following description for convenience only and is not limiting. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Figure 1:
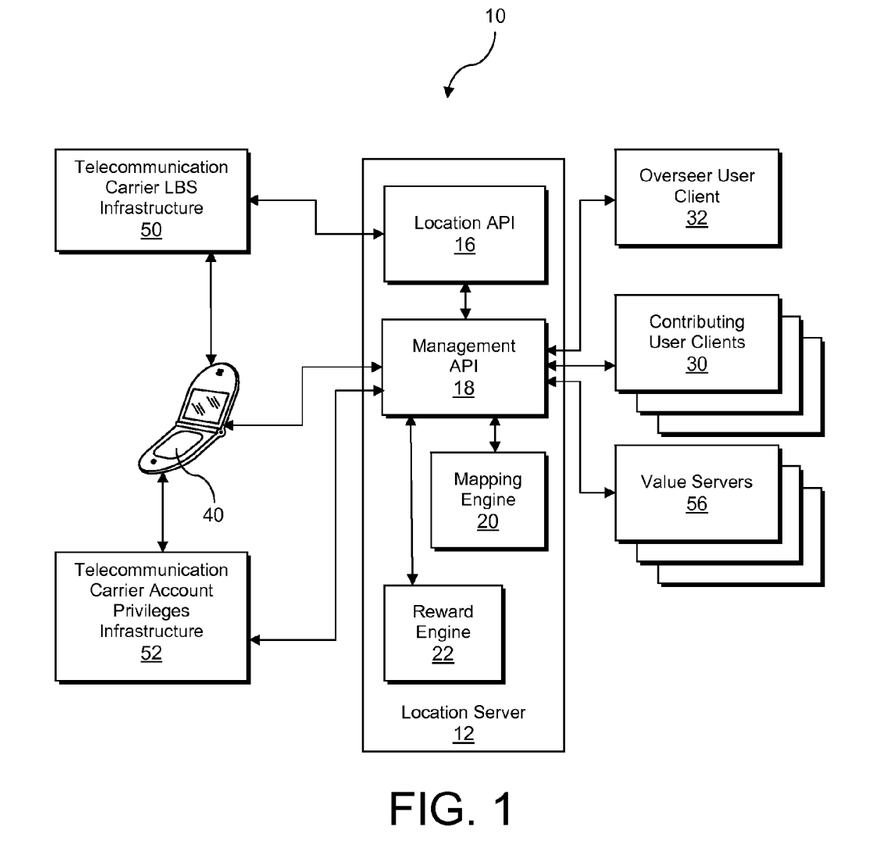
FIG. 1 is a schematic illustration of an exemplary operating environment in which a user contribution based mapping system is operable according to a preferred embodiment of the present invention.

Referring to FIG. 1, a schematic illustration is shown of an exemplary operating environment 10 in which a preferred system for implementing user contribution based mapping in the form of a location server 12 may be used. The location server 12 includes one or more computing devices and one or more memory devices, which computing devices and memory devices may be integrally constructed or connected in any suitable manner, for example via a network. The location server 12 provides a platform which enables a location application program interface (API) 16, a management API 18, a mapping engine 20, and a rewards engine 22.

The management API 18 is configured to receive identifying information from a plurality of contributing users through respective contributing user clients 30, such as personal computers, mobile telephone devices, or global positioning system (GPS) enabled devices, via a network connection, which network connection is preferably an Internet network connection. The identifying information of each user preferably includes a plurality of user identifying criteria including one or more of a user address, a user age, a user gender, and a user occupation. Alternatively, the identifying information can include any suitable user identifying criteria. The management API 18 is preferably configured to establish a plurality of contributing user accounts using the identifying information of the contributing users.

The management API 18 is further configured to receive from each of the plurality of contributing users via respective contributing user clients 30 an indication of one or more geographic areas. The indication of one or more geographic areas preferably includes one or more geographic areas and a rating of the one or more geographic areas. The one or more geographic areas may be designated by a user as an address, a plurality of addresses, a road or street, a plurality of roads or streets bounding an area, one or more neighborhoods or landmarks, or an area surrounding or in proximity to an address, a neighborhood or a landmark. The rating may include an indication that the one or more geographic areas are residential or commercial. The rating may alternatively include an indication of a perceived or actual level of safety of the one or more geographic areas. The rating is preferably received through the management API 18 as a scaled numeric indication within a predetermined range. For example, a contributing user may rate a particular area on a numeric scale from 1 to 5 for perceived safety, perceived concentration of residences, perceived concentration of commercial establishments, perceived vehicular congestion, or perceived availability of sidewalks.

The mapping engine 20 is configured to determine a quality value of the one or more geographic areas based on the indication of the one or more geographic areas from the plurality of contributing users. Preferably the quality value is determined as an average of the ratings received from the plurality of contributing users for an indicated geographic area. For example, if for a particular geographic area the management API 18 receives ratings from three different contributing users, the mapping engine 20 can average the ratings of the three users to generate a quality value for the particular geographic area. The mapping engine 20 preferably generates a map including one or more geographic areas and the determined quality values associated with each of the one or more geographic areas based on the indications received from a plurality of contributing users. The quality value of the one or more geographic areas is transmitted, preferably in the form of a map, via the management API 18 to one or more of the plurality of contributing users. The one or more of the plurality of users to whom a quality value of a particular geographic area is transmitted need not to have provided an indication of the particular geographic area for which the quality value is determined, but may have provided an indication of another geographic area. The quality value of the one or more geographic areas may further be transmitted to a user who did not contribute any indication of a geographic area. In such manner a user may benefit from the impressions of other users regarding a particular geographic area.

The mapping engine 20 preferably further determines the quality value based on the plurality of user identifying criteria received from each of the plurality of contributing users. The management API 18 is configured to receive an indication of one or more preferred user identifying criteria from a user who desires to receive a quality value for one or more geographic areas. The mapping engine 20 can thereafter determine the quality value of the one or more geographic areas based on the indication of the one or more geographic areas received from those of the plurality of users corresponding to the one or more preferred identifying criteria. For example, an indication of a preferred user identifying criterion received from a user may include a preferred user age group of 16-24 years in age. In such example, the mapping engine 20 uses the indication of one or more geographic areas received from ones of the plurality of users corresponding to the age group of 16-24 years to determine the quality value. In another example, an indication of a preferred identifying criterion may include a designated neighborhood, wherein the mapping engine 20 uses the indication of one or more geographic areas received from ones of the plurality of users living in the designated neighborhood to determine the quality value.

The management API 18 is preferably further configured to establish an overseer user account using identifying information of an overseeing user, and a subject user account using identifying information of a subject user, associated with a subject user mobile device 40, whom the overseeing user desires to track. The location server 12 is configured to receive the identifying information of the overseeing user and subject user through the management API 18 from an overseer user client 32 operated by the overseeing user, such as a personal computer, mobile telephone device, or global positioning system (GPS) enabled device, via a network connection, which network connection is preferably an Internet network connection. As set forth in this description, an overseeing user may include a person, for example a parent, guardian, or employer of a subject user. Alternatively, the overseeing user may include a non-person, for example a computing device configured to implement oversight requirements of a parent, guardian or employer of a subject user, or configured to enforce rules of a game in which a subject user is participating. The overseeing user is preferably a contributing user, and accordingly, the overseer user client 32 and contributing user client 30 are preferably a single user client. Alternatively, the overseeing user need not be a contributing user.

The received identifying information of the subject user and overseeing user may be personal and/or specific to a mobile device used by the subject user or overseer user. The received subject user identifying information preferably includes one or more of the name of the subject user, a telephone number associated with the subject user mobile device 40, a telecommunication carrier identifier, for example an account number, associated with the subject user mobile device 40 used to establish a connection with a telecommunication carrier providing service for the subject user mobile device 40, and a device-specific identifier of the subject user mobile device 40. A device-specific identifier, such as a MAC address, is required for embodiments of the invention in which the subject user mobile device 40 is not associated with any telecommunication carrier, for example a stand-alone GPS device not requiring telecommunication carrier service. Similarly, the received overseeing user identifying information preferably includes one or more of the name of the overseer user, a telephone number associated with a mobile device used by the overseer user, a telecommunication carrier identifier, and a device-specific identifier of an overseer user's mobile device.

The management API 18 preferably provides an interface to the overseer user through a client application running on the overseer user client 32, an interface to the contributing user through a client application running on the contributing user client 30, and an interface to the subject user through a client application running on the subject user mobile device 40. Alternatively, the overseer user client 32 and contributing user client 30 may be provided as a single user client running one or more client applications. The client application or applications preferably include a web client application, WAP client application, short message service (SMS) application, interactive voice response (IVR) application or other suitable client application, which client applications may include firmware or software downloadable to the subject user mobile device 40, the overseer user client 32, or the contributing user client 30.

As indicated above, the mapping engine 20 preferably generates a map including one or more geographic areas and the quality values associated with each of the one or more geographic areas. A quality value can be generated based on one or more preferred contributing user identifying criteria provided by the overseeing user through the overseer user client 32. The map which includes one or more geographic areas and quality values associated with each of the one or more geographic areas is transmitted to the overseer user client 32 via the management API 18.

The location server 12 is further configured to receive via the management API 18 an indication of one or more geographic areas from the overseer user client 32, the one or more geographic areas preferably corresponding to areas which the subject user is permitted to travel or not permitted to travel by the overseeing user. The location server 12 is preferably configured to receive information including one or more rules sets from the overseer user client 32 defining the desired behavior of the subject user with respect to the one or more geographic areas and providing indications of periods of time when the desired behaviors are applicable to the travel of the subject user. The location server 12 is further configured to transmit information to the subject user mobile device 40, including the geographic areas, rules sets, and periods of time, to provide the subject user with notification of the required travel behaviors.

The indication of one or more geographic areas received from the overseeing user client 32 by the location server 12 preferably includes an indication of a predetermined range of the quality value, which quality value as described above is determined based on the indications of one or more geographic areas received from the plurality of contributing users through the contributing user clients 30. The indication of one or more geographic areas received from the overseeing user client 32 preferably further includes an indication of whether the geographic areas corresponding to quality values within the predetermined range correspond to areas within which the subject user is allowed to travel or not allowed to travel. For example, if a quality value is generated on a scale of 1 to 5 by the mapping engine 20 based on indications from contributing users, an overseeing user may provide to the location server 12 an indication of a predetermined range of 4 to 5 and designate geographic areas having quality values determined to be within the predetermined range of 4 to 5 as not allowable for a subject user to travel within.

The indication of the predetermined range is stored in a database configured via the mapping engine 20. Preferably, the quality values of the one or more geographic areas are compared with the predetermined range to determine whether the quality values fall within the predetermined range. The location server 12 is preferably configured to receive via the location API 16 location information of the subject user mobile device 40 from a location based service (LBS) infrastructure 50 of a telecommunication carrier providing telecommunication service to the subject user mobile device 40. The LBS infrastructure 50 preferably receives the location information or data required to generate the location information from the subject user mobile device 40. Alternatively, the location server 12 may receive location information of the subject user mobile device 40 directly from the subject user mobile device 40, especially in instances where the mobile device 40 is a stand-alone device. Alternatively, the location server may receive location information from any suitable source in contact with the subject user mobile device 40. Preferably, the LBS infrastructure 50 or subject user mobile device 40 transmits location information to the location server 12 in the form of latitude and longitude of the subject user mobile device 40, which latitude and longitude may be determined via known methods such as tower-based or satellite (GPS) triangulation.

At the option of an overseeing user, if the location information received via the location API 16 indicates that the subject user mobile device 40 has entered a geographic area corresponding to a quality value falling within the predetermined range, an indication is transmitted to the overseeing user through the overseer user client 32 via the management API 18 notifying the overseeing user of the position of the subject user mobile device 40. Alternatively at the option of an overseeing user, an indication is transmitted to the overseeing user if the location information indicates that the subject user mobile device 40 has exited a geographic area corresponding to a quality value falling within the predetermined range. Alternatively at the option of an overseeing user, an indication is transmitted to the overseeing user if the location information indicates that the subject user mobile device 40 has failed to enter or exit a geographic area corresponding to a quality value falling within the predetermined range. Moreover, at the option of an overseeing user, a warning is transmitted to the subject user mobile device 40 via the management API 18 if the location information indicates that the subject user mobile device 40 has entered or exited, or failed to enter or exit, a geographic area corresponding to a quality value falling within the predetermined range. Preferably, a map is transmitted to the subject user mobile device 40 via the management API 18 displaying the one or more geographic areas and displaying in a suitable manner whether the quality value of the one or more geographic areas falls within the predetermined range provided by the overseeing user. The map transmitted to the subject user mobile device 40 preferably indicates whether the one or more geographic areas are designated by the overseer user as allowable or not allowable for travel by the subject user based on whether the quality value of the one or more geographic areas falls within the predetermined range. Accordingly, an overseeing user through the overseeing user client 32 can communicate a desire to the subject user through the subject user mobile device 40 via the management API 18 that the subject user is not permitted to enter or not permitted to leave a geographic area corresponding to a quality value falling within the predetermined range.

The management API 18 is further configured to transmit an instruction to the reward engine 22 to generate an indication of a reward if the location information indicates that the subject user mobile device 40 has entered or exited, or failed to enter or exit, depending on preference of an overseeing user, a geographic area corresponding to a quality value falling within the predetermined range. The indication of a reward preferably includes an indication of permissions granted to or revoked from the subject user. Granted or revoked permissions preferably include modifications to the indication of the predetermined range of the quality value or changes in communication permissions, for example increases or decreases in a number of permitted sent or received SMS messages, or duration of telephone calls made by the subject user mobile device 40. Coinciding with transmitting indications of communication permissions granted to or revoked from the subject user, the management API 18 preferably transmits instructions to a communications infrastructure 52 of a telecommunications carrier to implement changes in communication permissions associated with the subject user mobile device 40 consistent with the indication of a reward. The indication of a reward may alternatively include digital goods awarded to the subject user such as mobile device ringtones and application content, or indications of redeemable value such as a coupons or gift certificate codes which may be redeemed at predetermined establishments, for example online or physical stores. The reward engine 22 may be configured to automously generate and transmit through the management API 18 digital goods or indications of redeemable value to the subject user mobile device 40, or alternatively, the management API 18 may request and receive digital goods or indications of redeemable value from one or more remote value servers 56 configured to generate and transmit digital goods or indications of redeemable value.

The location server 12 via the management API 18 may alternatively transmit an indication to a remote value server 56 to transmit value from or to a first account associated with the overseer user to or from a second account associated with the subject user if the location information indicates that the subject user mobile device 40 has entered or exited, or failed to enter or exit, depending on preferences of an overseeing user, a geographic area corresponding to a quality value falling within the predetermined range. The remote value server 56 in such instance may include a banking server of a bank, or alternatively, a server of another monetary or non-monetary value managing entity, for example a server managing store credit, store coupon distribution, or digital goods distribution. The indication of a reward transmitted to the subject user mobile device 40 may include an indication of value transferred from or to the account associated with the subject user or an indication of redeemable value such as a coupon or gift certificate code.

Figure 2:
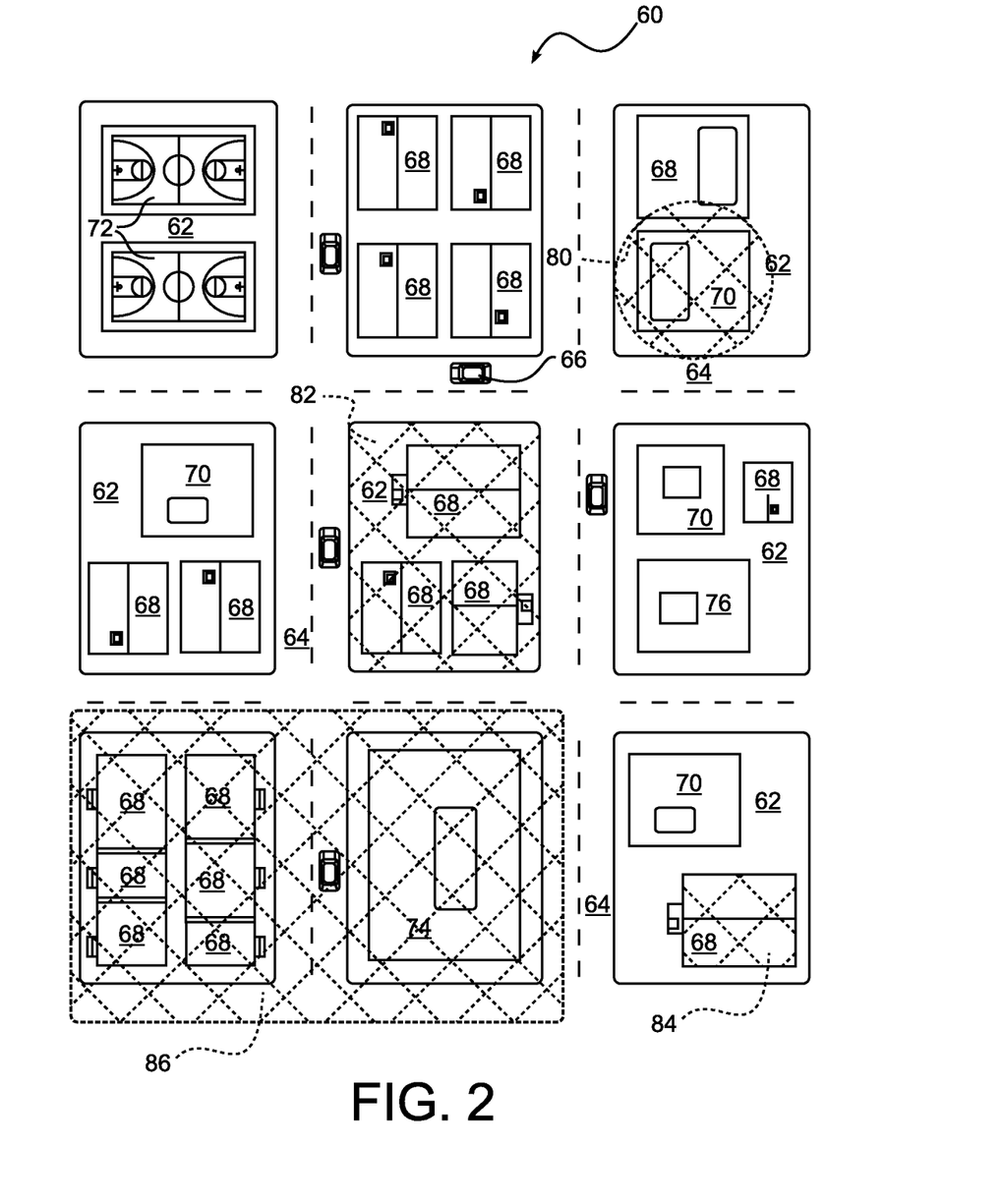
FIGS. 2-3 are plan views of an example city streetscape in which the preferred system of FIG. 1 is implemented.

Referring to FIG. 2, a plan view is shown of an example city streetscape 60 in which the system including the location server 12 is implemented. The streetscape 60 includes city blocks 62 separated by streets 64 permitting travel of vehicles 66. Various structures are provided on the city blocks 62 including homes 68, commercial establishments 70, playgrounds 72, a school 74, and a library 76. In this example, the location server 12 receives from a plurality of users through the management API 18 indications of geographic areas 80, 82, 84, 86 including ratings. The geographic areas 80, 82, 84, 86 correspond respectively to a commercial establishment 70, a city block 62, a home 68, and a neighborhood including homes 68 and a school 74. The indications of the geographic areas 80, 82, 84, 86 are preferably received from the contributing user clients 32 as an indication of an address, a rating for the address, and a manner of associating a geographic area with the address, wherein the management API 18 provides the contributing user clients 32 with a plurality of predetermined selectable manners of associating a geographic area with a rated address.

A first preferred user-selectable manner in which a geographic area is to be associated with a rated address includes defining the geographic area by a radius extending from an approximate center of a rated address, as shown for example by the first geographic area 80, which is a circular area having center at an approximate center of the property of the underlying commercial establishment 70. A second preferred user-selectable manner in which a geographic area is to be associated with a rated address includes defining an area by a perimeter of a block 62 on which the rated address is located, as shown for example by the second geographic area 82. A third preferred user-selectable manner in which an area is to be associated with a rated address includes defining an area by a perimeter of a property corresponding to the entered address or a structure on the property, as shown for example by the third geographic area 84. A fourth preferred user-selectable manner in which an area is to be associated with a rated address includes defining an area by a predetermined neighborhood boundary within which the address is located, as shown for example by the fourth geographic area 86. In addition to receiving indications of geographic areas through designation of addresses, the indications of the geographic areas may be received as rated streets, neighborhoods, cities or any suitably definable region. The mapping engine 20 is preferably configured to use stored streetscape data to generate a geographic area based on the rated address and the selected manner in which a geographic area is to be associated with the rated address.

The mapping engine 20 determines a quality value for each of the geographic areas 80, 82, 84, 86 based on ratings for those geographic areas received from a plurality of contributing users through the contributing user clients 30. The mapping engine 20 is preferably further configured to determine a quality value for a particular geographic area based on ratings received from contributing users which correspond to a plurality of dissimilar geographic areas. For example, if one contributing user provides a rating for the school 74, another contributing user provides a rating for a street 64 adjacent to the school 74, and another contributing user provides a rating for the neighborhood 86 in which the school 74 is located, the mapping engine 20 may use the three ratings, preferably using a suitable weighted averaging technique, to determine the quality value for the neighborhood 86.

Figure 3:
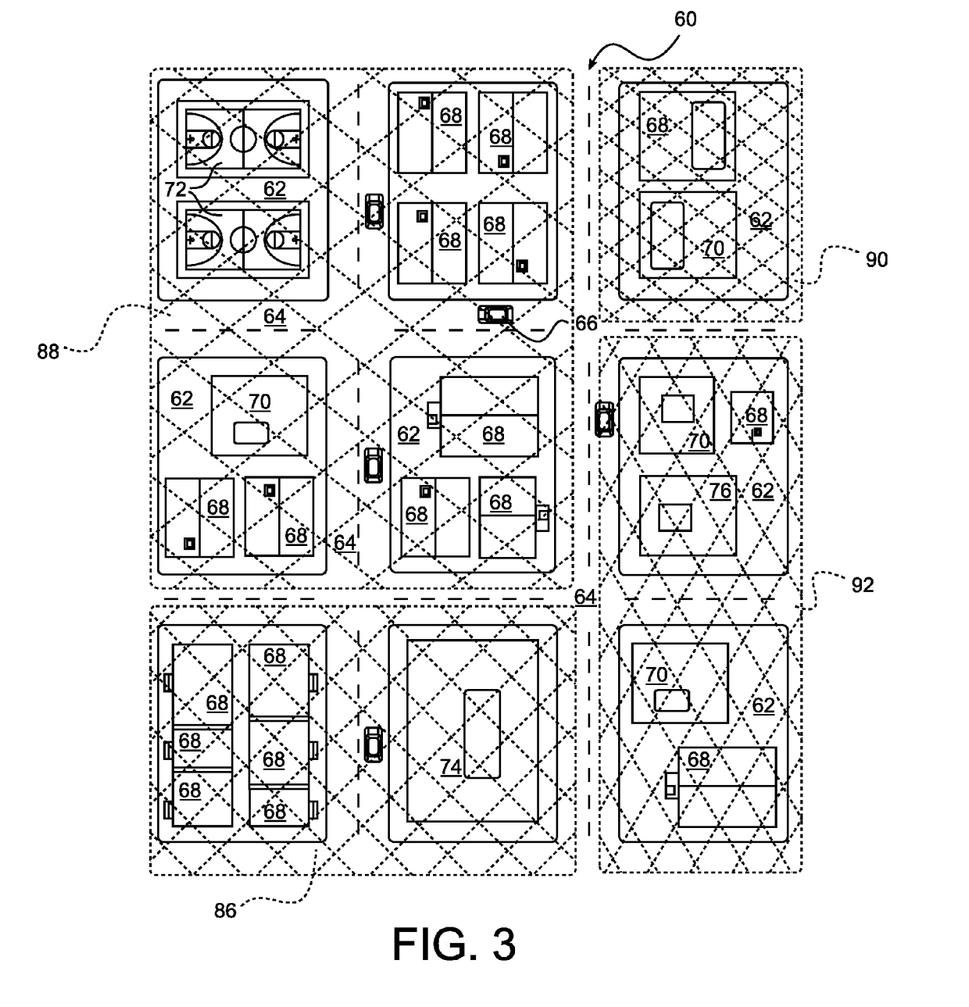

The mapping engine 20 is further preferably configured to divide a particular region into geographic areas of predetermined dimension and to determine a quality value for each of the geographic areas in the particular region based on indications of geographic areas received from contributing users through contributing user clients 30. For example, in the streetscape 60, the mapping engine 20 may determine a quality value for each of the city blocks 62 or each of the streets 64. Referring to FIG. 3, the mapping engine 20 may alternatively divide the streetscape 60 into neighborhoods 86, 88, 90, 92 and determine the quality value of each of the neighborhoods 86, 88, 90, 92. The management API 18 can receive an indication of a desired predetermined range of the quality value from an overseeing user through an overseer user client 32. The management API 18 can further transmit an indication to the overseeing user via the overseer user client 32 if the location information indicates that the subject user mobile device 40 has entered or exited, or alternatively failed to enter or exit, depending on a preference of the overseeing user, ones of the neighborhoods 86, 88, 90, 92 corresponding to a quality value falling within the indicated predetermined range. The management API 18 further transmits an indication to the subject user mobile device 40 and the overseer user client 32 of the quality values of each of the neighborhoods 86, 88, 90, 92 and an indication of which of the neighborhoods 86, 88, 90, 92 correspond to a quality value falling within the predetermined range.

Figure 4:
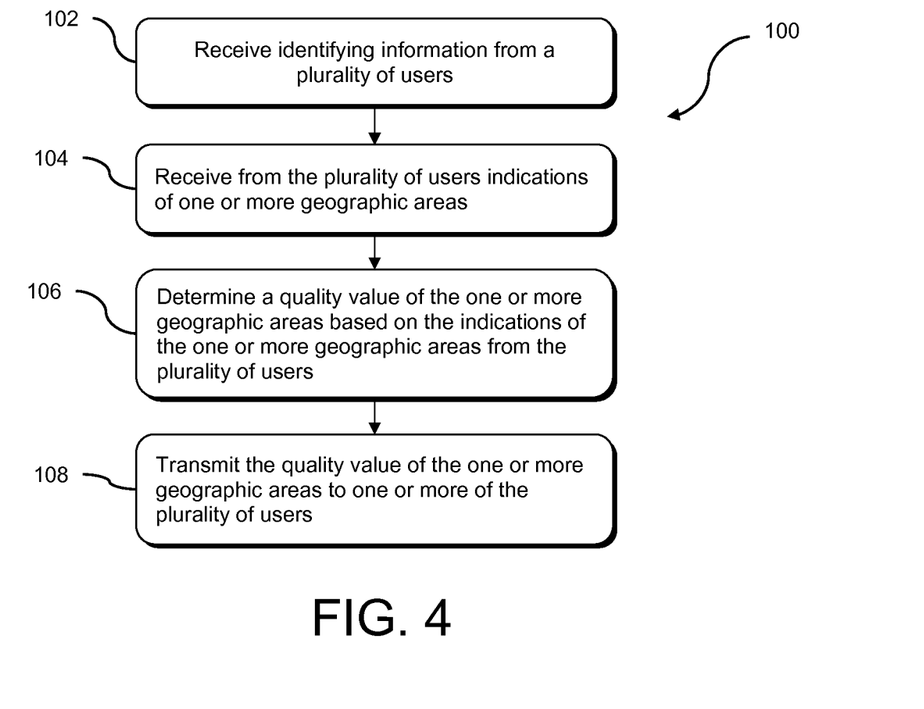
FIG. 4 is a flow chart showing a computer-implemented user contribution method according to a preferred embodiment of the present invention.

Referring to FIG. 4, a computer implemented user contribution method 100 according to a preferred embodiment of the present invention is shown. The method includes receiving identifying information from a plurality of users (step 102) and receiving from the plurality of users indications of one or more geographic areas (step 104). A quality value of the one or more geographic areas is determined based on the indications of one or more geographic areas from the plurality of users (step 106), and the quality value is transmitted to one or more of the plurality of users (step 108).

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented user contribution method comprising:

receiving a plurality of user identifying criteria from a plurality of users;

receiving from the a plurality of users indications of at least one geographic area comprising ratings of the at least one geographic area;

receiving from a first user an indication of at least one preferred user identifying criteria and an indication of a predetermined range of quality value;

determining a quality value of the at least one geographic area based on at least one indication of the at least one geographic area received from at least one of the plurality of users corresponding to the at least one preferred user identifying criteria;

comparing the quality value of the at least one geographic area with the predetermined range and determining whether the quality value falls within the predetermined range;

receiving via a network mobile device location information of a user mobile device corresponding to a second user from at least one of the user mobile device and a remote telecommunication carrier server in communication with the user mobile device indicating that the user mobile device has at least one of entered and exited the at least one geographic area; and transmitting an indication of communication permissions revoked from the user mobile device when the user mobile device has exited the at least one geographic area if the quality value of the at least one geographic area falls within the predetermined range.

2. The computer-implemented user contribution method of claim 1, further comprising receiving the user identifying criteria as at least one of a user address, a user age, a user gender, and a user occupation from the plurality of users.

3. The computer-implemented user contribution method of claim 1, wherein the first user comprises at least one of the plurality of users, and the indication comprises a warning.

4. The computer-implemented user contribution method of claim 3, further comprising transmitting a map to the user mobile device displaying the at least one geographic area and displaying whether the quality value of the at least one geographic area falls within the predetermined range.

5. The computer-implemented user contribution method of claim 1, further comprising transmitting a map to the user mobile device displaying the at least one geographic area and displaying whether the quality value of the at least one geographic area falls within the predetermined range.

6. The computer-implemented user contribution method of claim 1, further comprising establishing a user account for each of the plurality of users using the user identifying criteria.

7. The computer-implemented user contribution method of claim 1, wherein receiving the indications of at least one geographic area further comprises receiving an indication of an address.

8. The computer-implemented user contribution method of claim 1, further comprising receiving the at least one rating of the at least one geographic area as an indication that the at least one geographic area is at least one of residential and commercial.

9. The computer-implemented user contribution method of claim 1, further comprising receiving the at least one rating of the at least one geographic area as a safety rating.

10. The computer-implemented user contribution method of claim 1, wherein receiving the indications of at least one geographic area comprises receiving a plurality of ratings of the at least one geographic area from the plurality of users, and wherein the quality value is determined as an average of the plurality of ratings from the plurality of users.

11. The computer-implemented user contribution method of claim 1, further comprising transmitting through a computer network a map to the first user displaying the at least one geographic area and the quality value of the at least one geographic area in relation to a surrounding area.

12. The computer-implemented user contribution method of claim 1, further comprising transmitting the quality value of the at least one geographic area to the first user.

13. The computer-implemented user contribution method of claim 1, further comprising:

receiving from the plurality of users indications of a plurality of geographic areas;

receiving mobile device location information of the user mobile device from at least one of the user mobile device and a remote telecommunication carrier server in communication with the user mobile device indicating that the user mobile device has at least one of entered and exited at least one of the plurality of geographic areas; and transmitting an indication to the first user that the user mobile device has at least one of entered and exited the at least one of the plurality of geographic areas if the quality value of the at least one of the plurality of geographic areas falls within the predetermined range.

14. The computer-implemented user contribution method of claim 1, wherein the at least one geographic area comprises a plurality of geographic areas, and wherein the indication transmitted to the first user is transmitted if the user mobile device corresponding to the second user has at least one of entered and exited one of the plurality of geographic areas.

15. The computer-implemented user contribution method of claim 1, wherein receiving the indications of at least one geographic area comprises receiving a plurality of scaled numeric ratings of the at least one geographic area from the plurality of users, and wherein the quality value is determined as an average of the plurality of scaled numeric ratings from the plurality of users.

16. A user contribution based mapping system comprising at least one computing device including at least one memory comprising instructions operable to enable the computing device to perform a procedure comprising:

receiving user identifying criteria from at least a first user and a second user;

receiving from the at least the first user and the second user indications of at least one geographic area comprising ratings of the at least one geographic area;

receiving an indication of at least one preferred user identifying criteria and an indication of a predetermined range of quality value from a third user;

determining a quality value of the at least one geographic area based on the indications of the at least one geographic area from the at least the first user and the second user in response to the at least the first user and the second user corresponding to the at least one preferred user identifying criteria;

comparing the quality value of the at least one geographic area with the predetermined range and determining whether the quality value falls within the predetermined range;

receiving mobile device location information of a user mobile device corresponding to a fourth user from at least one of the user mobile device and a remote telecommunication carrier server in communication with the user mobile device indicating that the user mobile device has at least one of entered and exited the at least one geographic area; and transmitting an indication of communication permissions revoked from the user mobile device when the user mobile device has exited the at least one geographic area if the quality value of the at least one geographic area falls within the predetermined range.

17. The user contribution based mapping system of claim 16, wherein the at least one memory further comprises instructions operable to enable receiving from the third user at least one indication of the at least one geographic area.

18. The user contribution based mapping system of claim 16, wherein the at least one geographic area comprises a plurality of geographic areas, and wherein the indication transmitted to the third user is transmitted if the user mobile device corresponding to the fourth user has at least one of entered and exited one of the plurality of geographic areas.

* * * * *